United States Patent [19]

Spies

[11] 3,831,732

[45] Aug. 27, 1974

[54] APPARATUS FOR HANDLING AND TRANSPORTING CYLINDRICAL ARTICLES AND THE LIKE

[75] Inventor: Harvey A. Spies, Baltimore, Md.

[73] Assignee: Maryland Cup Corporation, Owings Mills, Md.

[22] Filed: Nov. 16, 1971

[21] Appl. No.: 199,269

[52] U.S. Cl............................................. 198/20 R
[51] Int. Cl. .......................................... B65g 47/00
[58] Field of Search ......... 198/20 C, 20, 69, 70, 26, 198/65, 47; 222/56; 221/10; 131/25

[56] References Cited
UNITED STATES PATENTS
1,609,802  12/1926  Ekstrom et al. ..................... 198/24
3,501,052  3/1970  Rudszinst.......................... 222/56 X FOREIGN PATENTS OR APPLICATIONS
23,701  8/1956  Germany ............................ 221/10
953,776  12/1956  Germany ............................ 131/25

Primary Examiner—Richard A. Schacher
Assistant Examiner—Douglas D. Watts
Attorney, Agent, or Firm—Herbert M. Birch; Terrell C. Birch; Anthony L. Birch

[57] ABSTRACT

A device for handling and transporting substantially cylindrical elongated objects between a supply station and a work station, such as a wrapping or packaging station, is described. An intermediate storage means is provided to temporarily store objects in the event that the rate of packaging of said objects falls below the rate of supplying said objects to the transport means. This enables the packaging operation to be shut down without affecting the supply or manufacturing rate of said objects.

23 Claims, 6 Drawing Figures

PATENTED AUG 27 1974 3,831,732

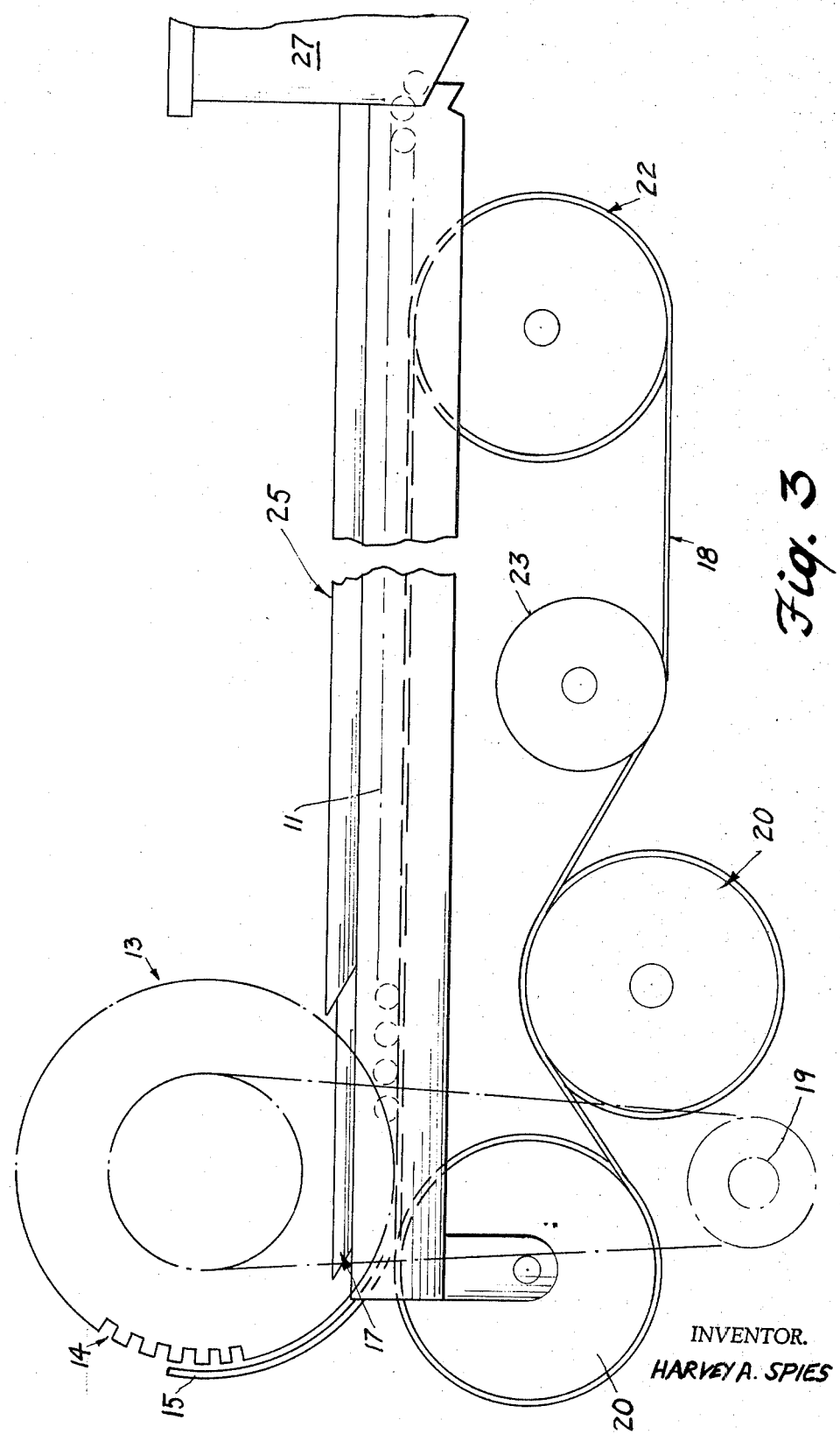

3,831,732

APPARATUS FOR HANDLING AND TRANSPORTING CYLINDRICAL ARTICLES AND THE LIKE

This invention relates to handling equipment for uniform elongated articles such as cylindrical objects and the like and more particularly, to a means for transferring such objects from a reservoir or hopper to a work station, such as a packaging or wrapping station, in a positive continuous manner.

It is therefore, an object of the present invention to provide new and novel apparatus for handling and transferring substantially uniform elongated objects from a reservoir or supply station to a packaging or wrapping station.

It is therefore, an object of the present invention to provide new and novel apparatus for handling and transferring substantially uniform elongated objects from a reservoir or supply station to a packaging or wrapping station and wherein the mechanism provided is of optimum simplicity, operates at optimum speeds and is more efficient and reliable than handling devices previously known in the art.

It is a further object of the present invention to provide new and novel apparatus for handling and transferring substantially uniform elongated objects from a reservoir or supply station to an intermediate reservoir adjacent a packaging or wrapping station wherein the intermediate reservoir provides a temporary storage of said objects to accommodate the difference in the rate of transfer of said objects from the supply station and the rate of packaging at the packaging station.

It is still a further object of the present invention to provide new and novel apparatus for temporarily storing substantially elongated articles being transferred between a supply and packaging station whereby the packaging station may be momentarily shut down without inhibiting the transfer of articles from the supply station.

These and other objects of the invention will become more fully apparent with reference to the following specification and drawings which relate to a preferred embodiment of the present invention.

In The Drawings:

FIG. 3 is a partial sectional view taken along line 3—3 of FIG. 2;

The objects being handled by the apparatus of the present invention may be any substantially cylindrical or uniform elongated objects which are to be conveyed from a manufacturing or supply station to a wrapping or packaging station for packaging individually or in a predetermined group.

Figure 2:
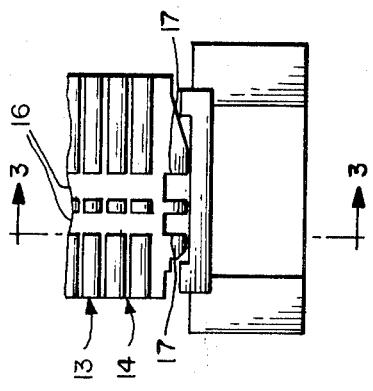
FIG. 2 is a partial sectional view taken along line 2—2 of FIG. 1.
Figure 1:
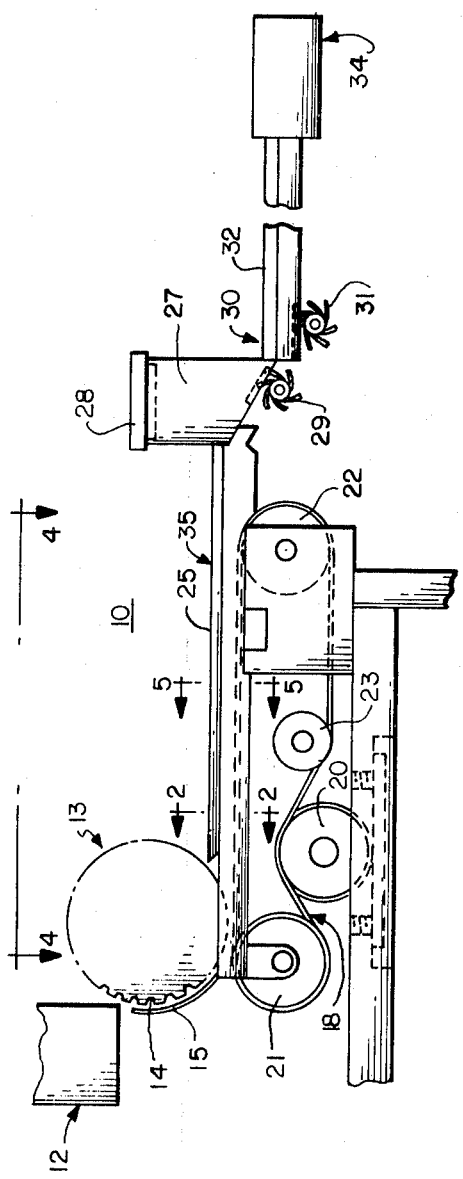
FIG. 1 is a side plan view of the article handling and transfer mechanism according to the invention.

Referring in detail to the drawings and more particularly to FIGS. 1 to 3 there is shown a machine complex 10 supported on an appropriate foundation, not shown. An object former or supply hopper 12 is provided for supplying objects 11 to a rotatable channeled drum 13 located beneath or adjacent to the outlet of the supply hopper 12. The channeled drum 13 has on its cylindrical periphery successive channels 14 evenly spaced and directed axially of the drum. The objects 11 in the hopper 12 fall by gravity between a guide shoe 15 and the drum 13 and then into channels 14 in said drum. The axial channels 14 are substantially semicylindrical in shape with a slightly larger diameter than that of the object being received.

As shown in more detail in FIG. 2 the channels 14 are divided into three sections by two extraction slots 16 extending around the periphery of drum 13. The slots 16 are operatively associated with extraction fingers 17 which extend into slots 16 and engage objects 11 in succession, as drum 13 rotates, and thereby remove objects 11 from channels 14 and entrain said objects into the channels of a belt conveyor to be described hereinafter. It should be understood that although two extraction slots and fingers are disclosed in the preferred embodiment of this invention a different number could be used without departing from the spirit of the invention.

Figure 6:
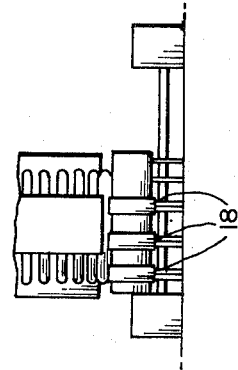
FIG. 6 is an end view taken from the left side of FIG. 1.

As shown in FIG. 6 the belt conveyor comprises a plurality of spaced parallel belts 18 having transverse channels therein for receiving objects 11 which have been extracted from drum 13. In a preferred embodiment belts 18 and drum 13 are driven by a common drive shaft 19 (FIG. 3) in combination with conventional timing belts and pulleys. However, said belts and drum can be rotated by other means, if desired.

As shown in FIGS. 1 and 3 the conveying belts 18 are driven by timing gears 20 over idler gears 21, 22 and tightened by idler pulley 23, whereby said belts define a horizontal transport path between gears 21, 22.

Figure 5:
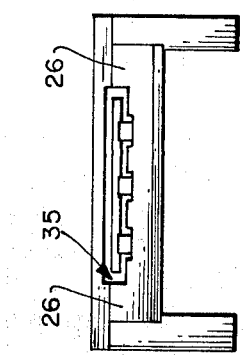
FIG. 5 is a sectional end view taken along line 5—5 of FIG. 1.
Figure 4:
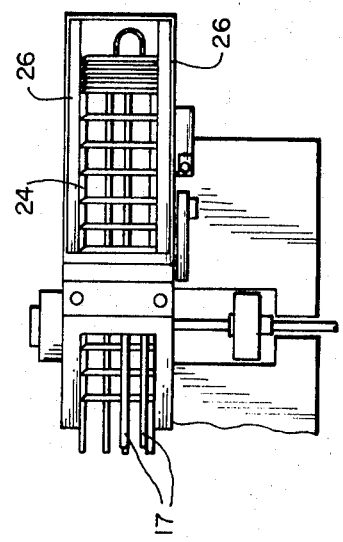
FIG. 4 is a partial top plan view of the apparatus of FIG. 1.

As shown in FIGS. 4 and 5 the belt conveyor further includes a plurality of rails 24 disposed in a horizontal plane just below the channels in belts 18 and spaced transversely in such a manner that the rails 24 are parallel to but offset from the belts 18 and thereby may extend between the belts and beyond the ends of the transport path defined by the belts 18. The conveying mechanism including the belts 18 and interspaced rails 24 is provided with a cover or guide plate 25, which in a preferred embodiment may be transparent and slotted for the removal of defective objects. Also provided are side rails 26 which in combination with rails 24 form a trough 35 as shown in FIGS. 4 and 5.

The trough 35 formed by rails 24, 26 together with cover 25 form a horizontal guide in which the objects 11 may be conveyed between the drum 13 and an intermediate storage hopper 27, as shown in FIGS. 1 and 3. Therefore, as the slots in belts 18 successively pass over and beyond idler gear 22 the objects 11 fall onto rails 24, where additional oncoming objects push the accumulated objects into an intermediate hopper 27. The cover plate 25 acts as a guide to maintain objects 11 in a parallel condition as they pass to intermediate hopper 27.

The hopper 27, as shown in FIG. 1 has a downwardly sloping floor which is as shown as 45° for the purpose of illustration. Also provided in hopper 27 is a biasing deadweight 28 which fits through an opening in the top of the hopper 27 and floats on the objects 11 accumulated in the hopper 27. In a preferred embodiment of the present invention biasing deadweight 28 is a block of Balsa wood. However, any other type of material of the proper weight and density could be used in its place without departing from the spirit and scope of the present invention. The hopper 27 is slotted at the bottom wherein a leather flapper wheel 29 contacts the lowermost objects and feeds them one at a time into a trough 30. The bottom of trough 30 is slotted to permit a second flapper 31 to contact the objects and transport them in succession to an appropriate wrapping or packaging device 34. Trough 30 is also provided with a transparent cover 32 to facilitate inspection of the objects 11 passing therethrough. A slot or opening in cover 32 may be provided to enable the removal of defective objects.

The operation of the apparatus of the present invention will now be briefly described. Objects 11 are fed at a predetermined rate from supply hopper 12 from which they descend by gravity between guide shoe 15 and rotating drum 13, wherein the objects are deposited in the respective channels 14. As the respective objects 11 are rotated by drum 13 said objects are successively engaged by extractor fingers 17 and are entrained into the transverse grooves of belts 18. The objects are then transported in trough 35 by belts 18 under cover plate 25 from idler gear 21 to idler gear 22 and are at that point transferred to rails 24. The objects 11 begin to accumulate on rails 24 but are held in a parallel coplanar relationship by means of cover plate 25. Therefore, as additional objects are transferred to rails 24 the accumlated objects are pushed successively into intermediate storage hopper 27. At this point, if the packaging or wrapping operation is progressing at a rate comparable to the said predetermined rate of supply at hopper 12, the objects 11 will pass directly through the slotted bottom of hopper 27. If, however, the packaging or wrapping operation is temporarily shut down or if said operation is progressing at a slower rate than the rate of supply from hopper 12, objects 11 will begin to accumulate in hopper 27. As accumulation occurs the incoming objects will engage the accumulated objects and by a caming action force deadweight 28 vertically upward to provide a temporary storage space until the packaging operation is resumed. At such time the accumulated objects will continue to flow from hopper 27 to trough 30 and on to the packaging station 34. The objects 11 are pushed through trough 30 by flapper wheel 31.

The provision of transparent cover plates 25 and 32 enables the objects 11 to be viewed or inspected. If a defective object is observed, it may then be removed through an appropriate opening in either of the respective troughs 30, 35 or cover plates 25, 32. The defective objects may be removed from trough 35 by shutting down the entire conveying operation but may be removed from trough 30 by merely temporarily shutting down the wrapping operation. This is a clear advance over the prior art systems and is facilitated by the provision of intermediate storage hopper 27.

Without further description it is believed that the advantages of the present invention over the prior art are apparent and while only a preferred embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be made to the appended claims.

I claim:

1. In a system for transporting elongated objects between a supply station and a work station, an article handling mechanism comprising:
   a. first trough means having an inlet for receiving elongated objects one at a time from said supply station; a bottom including spaced substantially parallel rails; vertical side portions; a cover plate; and an outlet;
   b. conveyor means in said first trough means including a plurality of endless belts having transverse grooves therein, said belts being interspaced with said rails, and wherein said rails extend beyond said belts in at least one end of said first trough means;
   c. intermediate storage means having an inlet for receiving said objects from the outlet of said first trough means and for storing said objects when the rate of ingress to said storage means exceeds the rate of egress from an outlet in said storage means;
   d. second trough means extending from the outlet of the intermediate storage means to said work station; and
   e. impeller means adjacent said outlet of said intermediate storage means for constraining said objects to travel from said intermediate storage means through said second trough means to said work station.

2. In a system according to claim 1, wherein said supply station includes a source of supply and a cylindrical drum containing a plurality of spaced object receiving axial channels on its periphery, wherein each channel receives one of said objects; and extraction means for removing said objects from said channels.

3. In a system according to claim 2, wherein there is further provided a guide means for holding said objects in said channels until said objects are removed by said extraction means.

4. In a system according to claim 2, at least one peripheral groove which intersects said respective channels; said extraction means comprising at least one finger which fits into said peripheral groove and thereby extracts said objects from the respective channels.

5. In a system according to claim 1, wherein said cover plate for said first trough means is formed of transparent material and wherein said cover plate contains at least one opening to provide access to said objects in said first trough means.

6. In a system according to claim 1, said intermediate storage means including biasing means for retaining said stored objects in a substantially parallel relationship.

7. In a system according to claim 6, said biasing means comprising a deadweight which floats on said stored parallel objects.

8. In a system according to claim 1, said second trough means including a slotted bottom through which said impeller means engages said objects.

9. In a system according to claim 1, said second trough including cover means for guiding said objects through said second trough.

10. In a system according to claim 9, said cover means for said second trough being transparent and having an opening therein to facilitate the removal of selected said objects.

11. In a system according to claim 1, said intermediate storage means including a slotted bottom through which said impeller means engages said objects.

12. In a system according to claim 4, wherein said cover plate for said first trough means is formed of transparent material and wherein said cover plate contains at least one opening to provide access to said objects in said first trough means.

13. In a system according to claim 4, said intermediate storage means including biasing means for retaining said stored objects in a substantially parallel relationship.

14. In a system according to claim 13, said biasing means comprising a deadweight which floats on said stored parallel objects.

15. In a system according to claim 4, said second trough means including a slotted bottom through which said impeller means engages said objects.

16. In a system according to claim 4, said second trough including cover means for guiding said objects through said second trough.

17. In a system according to claim 16, said cover means for said second trough being transparent and having an opening therein to facilitate the removal of selected said objects.

18. In a system according to claim 4, said intermediate storage means including a slotted bottom through which said impeller means engages said objects.

19. An apparatus including means for delivering substantially elongated objects from a supply station at a first rate of feed and means for receiving said objects at a work station at a second rate of feed the invention comprising:
   a. accumulator means between said supply and work stations, said accumulator means including a housing having an inlet for receiving said objects and an outlet through which said objects exit, said accumulator means temporarily storing said objects when said first rate of feed exceeds said second rate of feed;
   b. trough means extending from the outlet of said accumulator means to said work station;
   c. impeller means located adjacent to the outlet of said accumulator means for constraining said objects to travel through said trough means to said work station; and
   d. deadweight means which floats on said elongated objects and constrains said objects in a substantially parallel relationship.

20. An apparatus according to claim 19, said accumulator means including a slotted bottom through which said impeller means engages said elongated objects.

21. An apparatus according to claim 19, said housing of said accumulator means having a sloping floor terminating at said outlet.

22. An apparatus according to claim 19, said trough including a transparent cover and a slot in said cover for removing selected elongated objects therefrom.

23. An apparatus according to claim 19, said trough including a slotted bottom through which said impeller engages said objects.

* * * * *